(12) United States Patent
Horler et al.

(10) Patent No.: US 12,005,435 B2
(45) Date of Patent: Jun. 11, 2024

(54) LINEAR ACTUATOR

(71) Applicant: Reliance Precision Limited, Huddersfield (GB)

(72) Inventors: Gregory Douglas Horler, West Yorkshire (GB); Christopher Michael Hew, Sheffield (GB)

(*) Notice: Subject to any disclaimer, the term of this patent is extended or adjusted under 35 U.S.C. 154(b) by 181 days.

(21) Appl. No.: 17/434,141

(22) PCT Filed: Feb. 25, 2020

(86) PCT No.: PCT/GB2020/000021
§ 371 (c)(1),
(2) Date: Aug. 26, 2021

(87) PCT Pub. No.: WO2020/174207
PCT Pub. Date: Sep. 3, 2020

(65) Prior Publication Data
US 2022/0152605 A1 May 19, 2022

(30) Foreign Application Priority Data
Feb. 26, 2019 (GB) .................................... 1902567

(51) Int. Cl.
*B01L 3/02* (2006.01)
*G01N 35/10* (2006.01)
(Continued)

(52) U.S. Cl.
CPC ........ *B01L 3/0282* (2013.01); *G01N 35/1011* (2013.01); *G01N 35/1072* (2013.01);
(Continued)

(58) Field of Classification Search
CPC ............. B01L 3/0282; B01L 2200/026; B01L 2200/028; B01L 2200/0605;
(Continued)

(56) References Cited

U.S. PATENT DOCUMENTS

2007/0053797 A1  3/2007  Katsuaki
2017/0197208 A1  7/2017  Bachmann
(Continued)

FOREIGN PATENT DOCUMENTS

CN   101034827 A   9/2007
EP   2410342 A2    1/2012
(Continued)

*Primary Examiner* — Samuel P Siefke

(57) ABSTRACT

A linear actuator (10) for use in a modular assembly of such actuators comprises an actuator body (11), a shaft (12) guided by the body to be displaceable relative thereto in the sense of the longitudinal axis (13) of the shaft and a drive motor enclosed in the body and operable to axially displace the shaft relative to the body in two mutually opposite directions. The body has two mutually opposite sides (15a, 15b) respectively lying in two substantial parallel spaced-apart planes, which each represent a reference plane for positioning the body side-by-side with the body of another such actuator, and a further side (17b) connecting the two mutually opposite sides and stepped to form a projection (18) receiving the shaft (12) with the axis (13) parallel to the two planes and a rebate (19) beside the projection to permit the body to interlock with the body of another such actuator at that further side. The projection (18) and rebate (19) are of substantially the same width in the sense of the spacing of the two planes and the shaft (12) is disposed substantially centrally of the projection (18) so that when the body (11) is interlocked with that of another such actuator the pitch of the shaft axes (13) is equal to that width.

30 Claims, 2 Drawing Sheets

(51) Int. Cl.
*H02K 7/07* (2006.01)
*H02K 7/116* (2006.01)
*H02K 11/22* (2016.01)

(52) U.S. Cl.
CPC ............. *H02K 7/07* (2013.01); *H02K 7/1166* (2013.01); *H02K 11/22* (2016.01); *B01L 2200/026* (2013.01); *B01L 2200/028* (2013.01); *B01L 2200/0605* (2013.01); *B01L 2300/0609* (2013.01); *B01L 2300/0663* (2013.01); *B01L 2400/0478* (2013.01); *G01N 2035/1076* (2013.01)

(58) Field of Classification Search
CPC ..... B01L 2300/0609; B01L 2300/0663; B01L 2400/0478; B01L 3/5085; B01L 3/0227; B01L 3/02; B01L 3/0289; G01N 35/1011; G01N 35/1072; G01N 2035/1076; G01N 35/10; H02K 7/07; H02K 7/1166; H02K 11/22; H02K 7/06; H02K 7/081; H02K 5/04; F16H 19/04; F16H 57/033; F16H 2057/02069; F16H 2057/0335

See application file for complete search history.

(56) References Cited

U.S. PATENT DOCUMENTS

| | | |
|---|---|---|
| 2017/0354965 A1 | 12/2017 | Cote |
| 2018/0008975 A1* | 1/2018 | Schraut ................ B01L 3/0237 |
| 2018/0045285 A1 | 2/2018 | Wu |

FOREIGN PATENT DOCUMENTS

| | | |
|---|---|---|
| WO | 2012040556 A2 | 3/2012 |
| WO | 2019092089 A1 | 5/2019 |

* cited by examiner

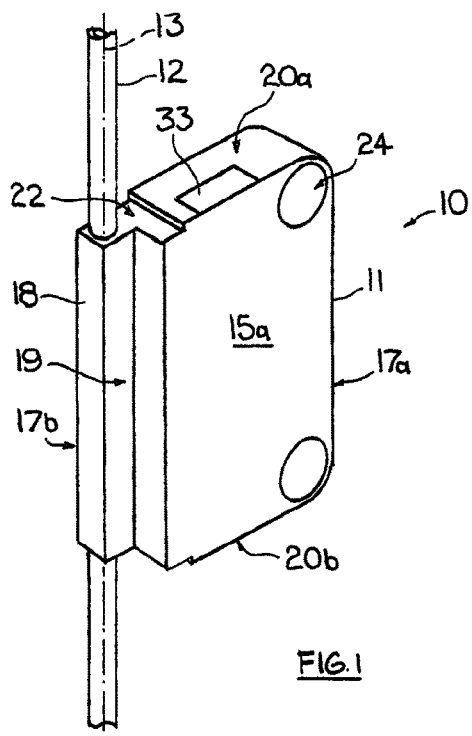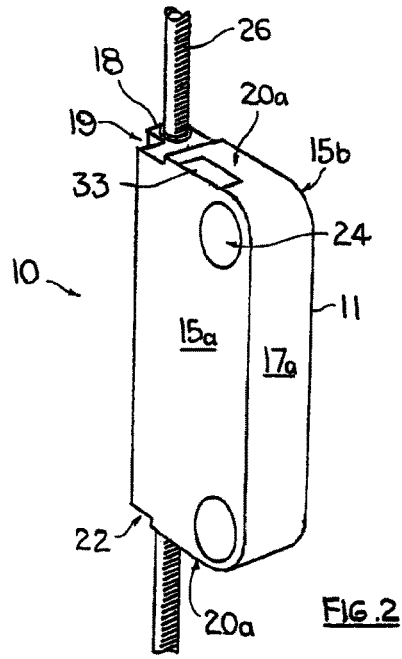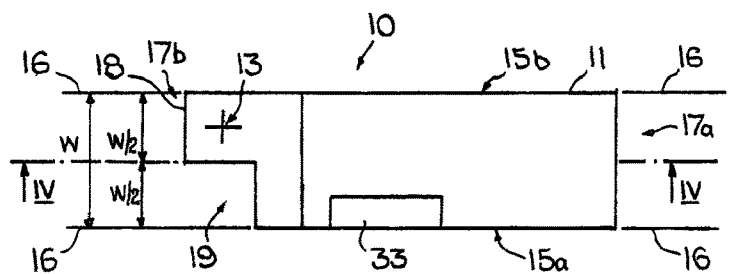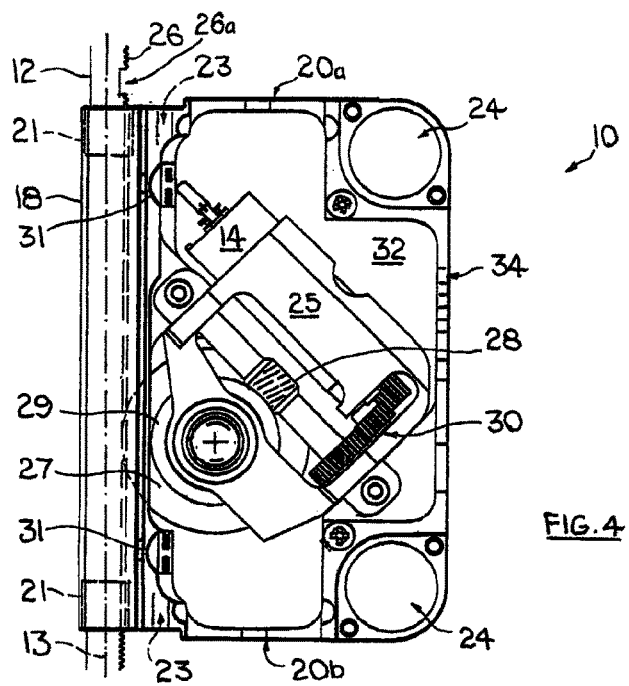

LINEAR ACTUATOR

CROSS REFERENCE TO RELATED APPLICATIONS

This application is a national stage entry of PCT/GB2020/000021, filed on Feb. 25, 2020, which claims priority to Great Britain patent application No. 1902567.5, filed on Feb. 26, 2019 and currently pending.

FIELD OF THE INVENTION

The present invention relates to a linear actuator and has particular reference to a linear actuator suitable for use in the creation of a modular assembly of such actuators. The invention further relates to an assembly of the actuators and to a machine incorporating the assembly.

BACKGROUND OF THE INVENTION

Linear actuators, that is to say drive units generating linear as opposed to rotary motion, exist in a great variety of forms and are employed for an equally diverse range of tasks. In most applications, such actuators are used individually and in general are not designed to be combined into assemblies, for which there may be a need only in specific circumstances. When there is such a need, a number of actuators may be assembled into a unit by way of a separate frame or other carrier and provide multi-axis drive in whatever direction should happen to be determined by the configuration and orientation of the carrier. Formation of an assembly in this way is not compatible with achieving optimum compactness of an assembly, if this should be a requirement. In addition, achieving a predefined relationship of the drive axes of the actuators in the assembly is entirely a function of how the separate frame or other carrier receives and mounts the actuators.

The need for an actuator capable of being combined with others to form a compact assembly with a specific spacing of drive axes is present in a number of fields, for example that of pipetting. Pipetting generally entails transfer of a measured volume of a liquid sample between a feed or store and a processing receptacle, for example a well of a well plate, for the purpose of reaction or other processing activity and subsequent analysis. Well plates, which are used on a large scale in laboratory and industrial applications, have multiple wells in a standardised format of rows in X and Y axial directions. Automated pipetting is carried out rationally with liquid transfer to or from a number of wells simultaneously. This can be achieved by a pipetting machine with a corresponding number of pipettes, i.e. elongate nozzle-like dispensers, mounted as a bank on a gantry which is movable towards and away from the well plate, thus Z-axis motion, and when raised additionally movable in at least one of the X-axis and Y-axis directions to displace the pipettes from row to row of the plate wells. Compatibility of the pipette spacing with the well spacing is the province of the gantry construction and pipette Z-axis motion is strictly a function of the gantry drive and consequently simultaneous for all pipettes. Such a pipetting machine may satisfactorily achieve its purpose in practice, but may be a relatively bulky construction of ad hoc design with significant limitations on flexibility and adaptability.

Pipetting on a high throughput basis is just one example of a potential requirement to combine linear actuators in a specific relationship to form an assembly.

SUMMARY OF THE INVENTION

It is therefore the principal object of the present invention to provide a linear actuator suitable for creation of a modular assembly, especially an assembly composed of a number of actuators which may be capable of individual operation and which have a defined relationship of their linear drive axes.

A further object is provision of a linear actuator which can be used to form an assembly with an arbitrary number of actuators so that the assembly has modularity in the sense of composition from a freely selectable number of modules.

Yet another object is design of a linear actuator able to be combined with other such actuators in such a way as to form an assembly which is compact and thus space-saving.

Other objects and advantages of the invention will be apparent from the following description.

According to the present invention there is provided a linear actuator for use in a modular assembly of such actuators, the actuator comprising an actuator body, a shaft guided by the body to be displaceable relative thereto in the sense of the longitudinal axis of the shaft and a drive motor supported by the body and operable to axially displace the shaft relative to the body in two mutually opposite directions, the body having two mutually opposite sides respectively lying in two substantially parallel spaced-apart planes which each represent a reference plane for positioning the body in side-by-side relationship with the body of another such actuator and a further side connecting the two mutually opposite sides and stepped to form a projection receiving the shaft with the longitudinal axis thereof substantially parallel to the two spaced-apart planes and a rebate beside the projection to permit the body to be positioned in interlocking relationship with the body of another such actuator at that further side, the projection and rebate being of substantially the same width in the sense of the spacing of the two spaced-apart planes and the shaft being disposed substantially centrally of the projection so that in the interlocking relationship of the body with that of another such actuator the pitch of the longitudinal axes of the shafts thereof is substantially equal to said width.

By virtue of the specified configuration of the body and the dimensioning and positioning of the projection, rebate and shaft, a linear actuator embodying the present invention is capable of being combined with another such actuator, in particular in the stated interlocking relationship, so that the axially displaceable shafts of the actuators have an axial pitch which is a fixed proportion of the width of the body as represented by the two spaced-apart planes. A further such actuator placed with its body in side-by-side relationship can also be oriented to have the same axial pitch. An assembly of multiple pairs of interlocked actuators positioned in side-by-side relationship at the reference planes can thus be built up in such a way that the axial pitch of the actuator shafts, when disposed in a line along the assembly, remains the same throughout. The interlock or interengagement facility of the actuator offers the possibility of constructing an assembly with optimum compactness: in effect, in the case of two actuators interlocked by interengagement of their projections and rebates, two shafts are accommodated within the width a single actuator body, that is to say the width of the spacing of the two planes representing the boundaries of the two mutually opposite sides of the actuator body. Regardless of its capability of being combined with other such actuators to form an assembly, the basic linear actuator has its own motor to afford the possibility of stand-alone operation, which means that the actuator can be operated individually whether alone or as part of assembly.

This represents a significant advantage in terms of flexibility or universality of use of the actuator. Further, the body can be of sufficient width to accommodate a motor without compromising a desired small shaft pitch.

In one convenient embodiment the body may comprise a casing supporting and enclosing the motor, in which case the body is effectively a closed unit protecting the motor and any associated components participating in transmission of drive to the shaft and control of the drive. The motor and other components can thus be screened in use from stray liquid and particulate solids. However, it is equally possible for the body to comprise a frame and for the motor to be supported by structural elements of the frame. Such a skeletal form of the body may simplify component access and possibly save weight and cost.

For preference, at least one of the two opposite sides is formed by a substantially continuous surface area lying in the respective one of the two spaced-apart planes. Either or both of the two sides thus presents a closed area, in which case it can be advantageous if either or possibly each of the sides is formed by a removable cover plate. This combines protection with ease of access to the motor and any associated components. Alternatively, should it be preferred at least one of the two opposite sides can be formed by a plurality of discrete surface areas lying in the respective one of the two spaced-apart planes. A continuous closed area as such is not essential to define the reference plane intended for determining positioning of the actuator in side-by-side relationship with another actuator.

Transmission of drive from the motor to the shaft can be achieved in various ways, with particular preference via a mechanically positive drive transmission. In that case and when the motor is an electric motor the shaft and motor can have a fixed relationship of motor rotation and shaft displacement, i.e. motor rotational angle and shaft axial position have a fixed association. Free displacement or slipping of the shaft, which may adversely affect synchronism in the context of an actuator assembly, is precluded. With advantage, in that case the mechanically positive drive transmission can comprise a rack extending along the shaft and a pinion meshing with the rack and rotatable by the motor, preferably with speed step-down translation in the direction of motor to pinion. A rack and pinion combination represents a simple and proven method of drive transmission and makes economic use of the shaft length as one drive partner.

However, a mechanically non-positive drive transmission arranged to transmit drive from the motor to the shaft is equally possible and may be advantageous in terms of cost, as well as offering protection by way of slip if displacement of the shaft should happen to be obstructed. Such a mechanically non-positive drive transmission can be realised in advantageously simple and economic manner by, for example, a friction surface extending along the shaft and a friction wheel frictionally engaging the friction surface and rotatable by the motor.

For preference, the actuator comprises a worm wheel and worm interposed between the motor and the transmission, the worm wheel being coupled to the transmission at a drive input thereof and the worm being drivingly engaged with the worm wheel and coupled to the motor at a drive output thereof. This not only provides a simple means of step-down of motor output speed, but also offers an advantageous block on reverse driving, such as by gravitational force exerted by the shaft, when the worm wheel is rotatable in opposite directions of rotation by the motor, but non-rotatable in either of those directions by the worm wheel. The shaft is accordingly locked in position except when driven by the motor.

Depending on the intended use of the actuator that shaft can be, for example, a solid rod or a tube. In the case of a rod, the shaft may have a displacing or actuating function without any secondary purpose. In the case of a tube, however, the shaft can have—in addition to a displacing function—a secondary function assigned to the tube bore. Thus, for example, the tube could be connectible with fluid conveying means and define a conduit for a fluid medium from the fluid conveying means. Alternatively, it could be connectible with a device and define a conduit for at least one conductor to or from the device. Such a dual function of the shaft extends the versatility of the actuator, particularly in the context of an assembly of actuators integrated in working apparatus of some kind involving transfer of fluid, which could be a liquid or a gas, such as compressed air or air at sub-atmospheric pressure used for suction.

In a preferred embodiment the actuator may comprise optical sensing means for sensing two spaced-apart end positions of the shaft relative to the body, so that stop points with respect to shaft axial displacement can be recognised or defined. Optical sensing represents a simple method of accurately determining the end positions without resort to mechanical interaction or contact, such as by wear-sensitive micro-switches or the like, with the shaft. The optical sensing means may be operable, for example, to emit light for incidence on the shaft and to respond to reflection of light from the shaft at each of the two end positions. Different reflectivity of the shaft at the relevant end positions can be achieved by various means, including formation of a reflective flat or other surface shape on the shaft. The response of the optical sensing means can be used for, for example, issue of a signal to switch off motor operation.

The scope for use of the actuator in formation of an assembly may be expanded if the actuator is usable in either one of two mutually inverted orientations with the shaft extending substantially vertically and if the actuator comprises means for determining in which of the two orientations the actuator is disposed. In effect, the actuator may be usable not only in an intended upright orientation, but also upside-down with respect to that orientation, which provides another dimension to creation of an assembly from multiple examples of the actuator. Determination of actuator orientation, which may be desirable or necessary for motor control or other purposes, can be carried out by reference to the influence of gravitational force, such as by way of an accelerometer. In conjunction with the aspect of alternative orientations of the actuator or for other reasons it may be advantageous to provide electrical connection means at each of an intended top and at an intended bottom of the body to allow electrical connection to the actuator selectably from either or each of above and below the actuator. Feed of power to the motor and any other loads of the actuator can thus be carried out from the same direction or location even in different orientations of the actuator.

As a further feature, the body of the actuator may have at least one passage for reception of guide means to guide displacement of the actuator in a direction substantially perpendicular to the two spaced-apart planes. If in use of the actuator the shaft axis represents a Z axial direction for the relative displacement of shaft and body the mentioned displacement of the actuator as a whole may represent an X or a Y axial direction. The guide means thus assists definition of the latter direction in the context of, for example, incorporation of the actuator in an assembly intended for X or Y movement. However, X or Y displacement may be equally relevant to specific circumstances of use of the actuator by itself.

In accordance with a further aspect of the invention there is provided a modular assembly comprising a plurality of actuators each as defined in the foregoing, the actuators being connected together to form a unit in which the longitudinal axes of the shafts of the actuators of the assembly are disposed in a line at a substantially constant pitch. The advantages of an actuator having the particular body configuration and shaft disposition as outlined above are particularly evident in the assembly: in the assembly a linear arrangement of the shafts of the constituent actuators and an equidistant shaft spacing result simply from the act of appropriately placing the actuators together to create the assembly. The actuator body size, especially width, can be determined at the outset in correlation with a spacing desirable or necessary for performance of an intended task of the assembly actuators, such as co-operation of the shafts with targets at a given spacing. Such targets may be, for examples, the wells of a well plate of standard format. Depending on assembly size, the assembly may be composed of both a number of the actuators with the bodies thereof positioned in the interlocking relationship and a number of the actuators with the bodies thereof positioned in the side-by-side relationship. The dual relationships of the actuators, i.e. interlocking and side-by-side, results in an assembly which is particularly compact in size for a given number of actuators. In effect, by comparison with a mere side-by-side relationship, twice as many actuators can be provided in an assembly of given length in the direction of the line of shafts.

According to yet a further aspect of the invention there is provided a machine comprising an assembly as defined above and control means for controlling the motors of the actuators of the assembly to displace the shafts of the actuators. The shaft displacement can thus be controlled in dependence on the task assigned to the machine. For example, control means may be operable to cause the motors to displace the shafts of the actuators individually in a predetermined sequence so that the shafts can interact sequentially with individual targets. Additionally or alternatively the control means may be operable to cause the motors to displace the shafts of the actuators in groups, in which the shafts in each group are displaced simultaneously, and/or operable to cause the motors to displace all the shafts of the actuators simultaneously. Each such displacement pattern can be associated with a particular mode of operation of the machine and the control means can be designed to be programmable or subject to a programmed control to provide a pattern appropriate to task.

In an enhancement, the machine comprises displacing means for displacing the assembly in a direction substantially perpendicular to the two spaced-apart planes of each actuator, so that apart from shaft displacement the assembly as a whole can be moved in a desired, for example X or Y, direction. This provides the machine with a capability of, in effect, scanning multiple targets if the targets themselves are stationary.

In one advantageous realisation the machine is a pipetting machine in which the pitch of the longitudinal axes of the shafts of the actuators of the assembly substantially corresponds with a given pitch of a plurality of receptacles for liquid samples, such a pitch being, especially, the pitch of the wells of a well plate of a standard format. Well plates are mass-production items used on a large scale in laboratory and other applications and for that reason have been developed with a standard size and pitch of wells to accommodate a given number in a single plate. The shaft pitch in the assembly, which at the outset is determined by the body width of an individual actuator, can thus be predefined for optimum compatibility with the layout of wells in such a well plate. In practical realisation of a pipetting machine the assembly can be oriented so that each of the shafts of the actuators forming the assembly is raisable and lowerable by the axial displacement and is equipped for co-operation in a lowered position with a respective receptacle, especially a well of a well plate, for a liquid sample. Such shaft equipment can take the form of means for at least one of discharging liquid into and inducting liquid from the respective receptacle, for example a pipette, a pump or suction device with a pipette extension, or other attachment appropriate to the respective task.

BRIEF DESCRIPTION OF SEVERAL VIEWS OF THE DRAWINGS

A preferred embodiment of the present invention will now be more particularly described by way of example with reference to the accompanying drawings, in which:

FIG. 1 is a schematic perspective view of a linear actuator embodying the invention, from one side, the top and the front;

FIG. 2 is a schematic perspective view of the actuator of FIG. 1 from the same side, the top and the back;

FIG. 3 is a schematic plan view, to enlarged scale, of the actuator of FIGS. 1 and 2;

FIG. 4 is a schematic sectional view, to reduced scale, on the line IV-IV of FIG. 3;

DETAILED DESCRIPTION OF THE ILLUSTRATED EMBODIMENTS

Figure 5:
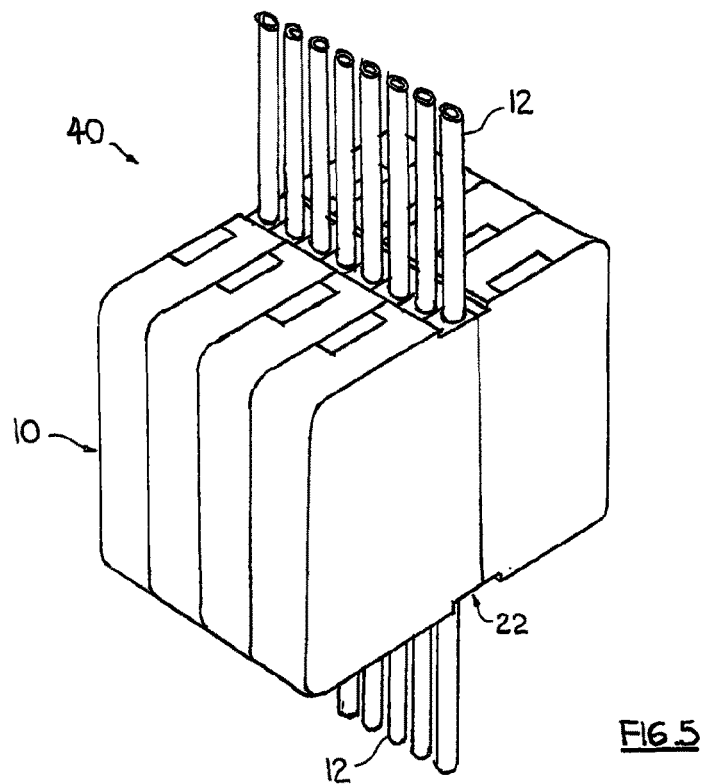
FIG. 5 is a schematic perspective view of an assembly of linear actuators each corresponding with that of FIGS. 1 to 4.

Referring now to the drawings there is shown a linear actuator 10 for use in forming a modular assembly 40 (FIGS. 5 to 7) of such actuators, the actuator comprising an actuator body 11, a shaft 12 guided by the body to be displaceable relative thereto in the sense of the longitudinal axis 13 of the shaft, and a speed-controllable, reversible-drive electric motor 14 (FIG. 4) enclosed in and supported by the body and operable to axially displace the shaft in two mutually opposite directions. In the actuator orientation shown in the drawings, those directions are vertically up and down, thus along a Z-axis, but the directions can be in any sense depending on the selected actuator orientation.

The body 11 is of substantially parallelopipedonal form with, in particular, two mutually opposite planar sides 15a and 15b which form major faces of the body and respectively lie in two substantially parallel spaced-apart planes 16, each plane representing a reference or contact plane for side-by-side positioning of the body 11 against that of another such actuator. The spacing of the two planes 16 determines the width w of the body 11. By way of example, the width can be 18 millimetres, which is a dimension characterising twice the spacing of adjacent wells in a well plate (see further below). The two sides 15a and 15b are connected by two further sides 17a and 17b, which again are mutually opposite and which constitute minor sides of the body. One of the further sides 17a is planar, but the other 17b is stepped to form a projection 18 and a rebate 19 beside the projection, each of the projection 18 and rebate 19 being of substantially the same width in the sense of the spacing of the two planes 16. Hence each of the projection 18 and the rebate 19 has a width w/2 equal to half the width w of the body 11. The body is completed by two further sides 20a and 20b, which in the illustrated orientation of the actuator respectively form a substantially planar upper face and a substantially planar lower face.

The body 11 has the form of a hollow casing, preferably formed for the major part (excepting the projection 18) by a box-like shell which has a cavity and which is a casting, a CNC-machined metal component, a three-dimensional printed article, a moulding of high-density plastics material, a layered composite of carbon-fibre or other high-strength synthetic or a body produced by any other suitable material and/or by any other suitable method. The cavity is open at one of the sides 15a and 15b, here the side 15a, of the body and is closed by a plastics material cover removable to provide access to the cavity.

Although the body 11 of the actuator 10 would normally have the form of an entity, it is possible for the body to be a component with one or more separate outlying elements or spacers co-operating with the component to form the body. The term "body" is thus to be regarded as also embracing separately constructed parts disposed in association with one another to provide a unit.

The shaft 12 guided by the body 11 is disposed centrally in the projection 18, specifically slidably received in a bore passing through the projection such that the axis 13 of the shaft is substantially parallel to the planes 16 and also substantially perpendicular to the two sides 20a and 20b of the body 11. Sliding guidance of the shaft 12 in the bore of the projection 18 is provided by two bearing bushes 21 of slide-bearing material, such as bronze or a hard thermoplastics material, fitted in the bore at its opposite ends. The shaft 12 itself can be a solid rod or a tube, here a tube with a through bore intended as a conduit for a fluid or for a filament or filaments, such as electrical or optical conductors. Depending on the use of the actuator 10 the shaft 12 can be provided at either or each end with attachment means, for example a screw thread, for detachably securing a fitting of any desired kind or directly with the fitting itself.

Figure 6:
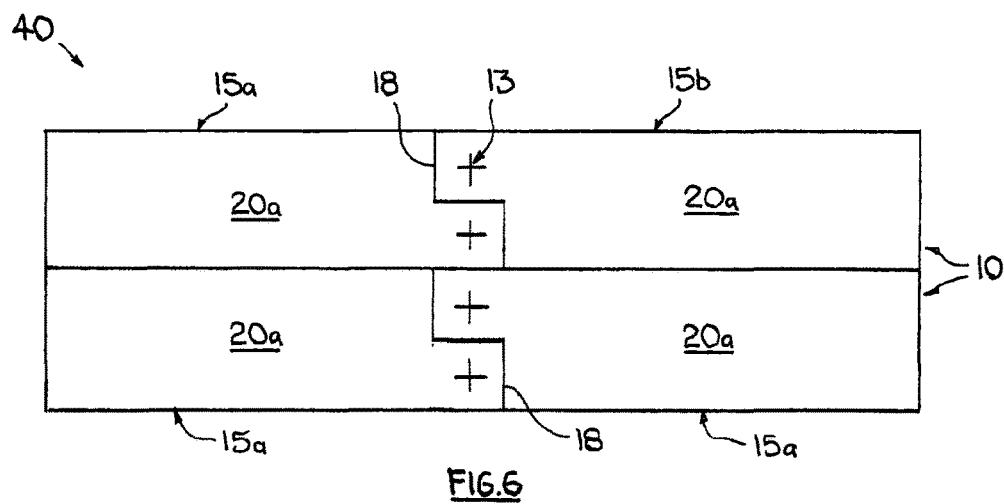
FIG. 6 is a diagram showing a first configuration of four actuators in an assembly such as that of FIG. 5.
Figure 7:
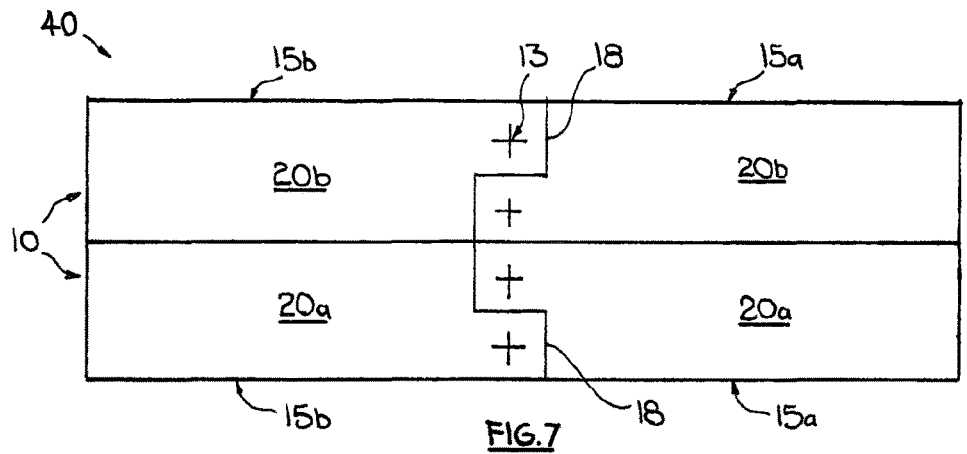
FIG. 7 is a diagram similar to FIG. 6, but showing a second configuration of the actuators.

Apart from positioning of the body 11 of the actuator 10 in side-by-side relationship with the body of at least one other such actuator as mentioned above, thus areal contact of two such bodies at their reference planes, a particular feature of the configuration of the body with the projection 18 and rebate 19 of corresponding width and the arrangement of the shaft 12 to extend centrally through the projection 19 is a capability of the body 11 of the actuator to interlock at the side 17b with the body of another such actuator, specifically an interlock produced by the engagement of the projection 18 of each actuator in the rebate 19 of the respective other actuator. For that purpose, the two actuators participating in the interlock are turned through 180 degrees so as to be juxtaposed as shown in FIGS. 5 to 7. In that case, the longitudinal axes 13 of the shafts 12 of the two interlocked actuator bodies will necessarily have a pitch, thus a shaft axial spacing, equal to the width of each projection 18 or rebate 19, i.e. w/2. The pitch is accordingly equal to half the width of the spacing w of the two spaced-apart planes 16 in which the sides 15a, 15b or major faces of the body 11 lie.

With respect to the side-by-side relationship it is possible for one pair of interlocked actuators 10 to be inverted relative to an adjoining pair of interlocked actuators 10, which is facilitated by construction of the body 11 of the individual actuator to be of substantially symmetrical external form with respect to a bisecting horizontal plane.

In order to enable interconnection of assembled actuators to form a rigid assembly 40 the body 11 of the actuator 10 is formed at each of the sides 20a and 20b with a recess 22 adjacent to and also extending over the projection 18. Each recess 22 serves to receive a connecting bracket (not shown), which is fixed to the body 11 by way of a set screw (not shown) engaged in a threaded bore 23 of the body 11 and which is similarly fixed to the bodies of the other actuators making up the respective assembly. Interconnection of the actuators by other methods is, of course, also possible.

In addition to the recesses 22, the body 11 is formed adjacent to the side 17a and therefore remote from the projection 18 and rebate 19 with two through bores 24 which are in addition respectively adjacent to the two sides 20a and 20b, the bores 24 thus opening at the two major sides 15a and 15b. The two bores 24 serve to receive guides (not shown) along which the actuator 10 or an assembly of such actuators can be displaced perpendicularly to the planes 16. The sense of this displacement depends on the respective orientation of the actuator or actuators, but is an X or a Y axial direction in the case of Z-axis shaft displacement The electric motor 14 provided for displacement of the shaft 12 relative to the body 11 is mounted in the cavity of the casing, which is defined by the body 11, by way of a chassis 25 and transmits drive to the shaft 12 by way of a rack and pinion transmission. The transmission consists of a rack 26 which extends along the shaft 12, in particular is formed integrally therewith by machining, at a side of the shaft facing towards the motor and of a pinion 27 which meshes with the rack and is rotatably mounted on the chassis 25 by way of an axle (schematically indicated by its axis). Interposed between the motor 14 and pinion 27 of the rack and pinion transmission is a worm 28 and worm wheel 29, the worm wheel being mounted on the same axle as the pinion 27 and optionally connected to or formed integrally with the pinion and the worm being disposed in driving engagement with the worm wheel and rotatably mounted in the chassis 25 by way of an axle. The worm 28 is in turn drivably coupled to the output of the motor 14 by way of a gearwheel or pinion train 30.

The transfer of drive via the intermediate worm 28 and worm wheel 29 precludes reverse driving by the shaft and thus undesired gravitationally-induced displacement of the shaft. The motor 14 can transmit drive to the shaft 12 via the gearwheel train 30, worm 28, worm wheel 29, pinion 27 and rack 26, but reverse transmission of drive by the shaft 12 via the rack 25, pinion 26 and worm wheel 28 is blocked at the point of interengagement of the worm wheel 29 and worm 28.

Detection of shaft position for the purpose of control of displacement by way of the motor drive is achieved through two optical sensors 31 serving to detect predetermined end positions of the shaft. Each sensor 31 comprises a light emitter located in the cavity of the body 11 in the vicinity of a respective end of the bore through the projection 18 and arranged to emit light in the direction of the shaft 12, the light being conducted through a respective passage which opens into the bore at the side of the shaft 12 provided with the rack 26. The rack is interrupted at a predetermined location by a flat 26a which, when aligned with each passage, reflects the emitted light to significantly greater extent than when any part of the rack is aligned with the passage, the light reflection by the rack being diffuse. The sensors 31 each respond to the increased level of reflected light to report attainment of an associated shaft end position and thereby trigger, for example, stopping or reversal of the motor operation. By this simple means the shaft 12 can be displaced in either direction and arrested when it has reached an intended end position.

Also mounted in the cavity is a printed circuitboard 32 carrying electronic control components providing operation and control of, inter alia, the motor 14 and optical sensors 31. Power supply and signal transmission are carried out via duplicate electrical connectors 33 provided at each of the sides 20a and 20b, use being made of either or both connectors as required. Provision of duplicate connectors allows, in the case of inversion of actuators within an assembly 40, input and output at a single side of the assembly. Motor control is also influenced by signals from a magnetic encoder (not shown) provided at the axle carrying the pinion 27 and worm wheel 29. Further, an accelerometer can be included to determine orientation of the actuator 10 in an assembly, since in the case of an inverted actuator the motor drive direction will be the reverse of that of a non-inverted actuator and the motor control adapted accordingly. Finally, the body 11 can be provided at the side 17a with cooling openings 35 to exhaust motor operating heat.

Use of the actuator 10 in creation of the modular assembly 40 is evident from the foregoing description. As can be seen in FIG. 5, which shows the assembly to be composed of four side-by-side pairs of interlocked actuators 10, optimum compactness is achieved in X and Y directions. The bodies 11 of the eight actuators 10 making up the assembly are interconnected by the afore-mentioned brackets (not shown), which are secured by set screws screwed into the threaded bores 23, to form a rigid unit in which the eight shafts 12 of the actuators are arranged with their longitudinal axes 13 disposed in a line at a substantially constant pitch. In the case of design of the actuator for use in creating an assembly intended for, for example, a pipetting machine the pitch of the shaft axes 13 is preferably 9 millimetres to correspond with the well spacing in a well plate of standard format. In operation of such a machine, the motors 14 of the actuators 10 making up the assembly 40 are operated and controlled by way of supply of current to provide reciprocating displacement of the shafts 12 between their predetermined—here upper and lower—end positions. In their lowered end positions, the shafts can co-operate in appropriate manner with appropriate individual targets, here the wells of a well plate, to or from which measured volumes of sample liquid can be transferred. In the raised end positions of the shafts the assembly as a whole can be displaced in X and/or Y direction to, for example, step the line of shafts between successive rows of wells or to displace the line of shafts along an individual row when the number of wells in a row is greater than the number of shafts in the respective assembly.

In such a machine, the motors 14 of the actuators 10 can be controlled to axially displace the shafts, for example, simultaneously as a whole, in groups or one at a time, perhaps sequentially, depending on requirements. However, the shafts are axially displaced individually in the sense that each is driven by an individual motor and Z axis shaft motion does not require movement of the assembly itself for that purpose. A considerable degree of freedom in selection of the pattern of displacement of the shafts 12 is therefore possible, for which purpose a pipetting machine incorporating such an assembly 40 can include a superordinate control influencing the control exercised by the individual control means of the actuators 10, particularly the timing of the operation of the motors 14.

The tubular shafts 12 in the machine can be employed directly as fluid conduits, such as for conveying liquid by a conveying device or merely by gravity, or inducting liquid by suction. Depending on use of the assembly, the fluid can be not only a liquid, but also a gas, such as compressed air or air at sub-atmospheric pressure. The tubular shafts can also be used, for example, as feeds for conductors to devices provided at the lower ends of the shafts.

FIGS. 6 and 7 show, in self-explanatory manner, two different possibilities of arrangement of, by way of example, four actuators. In FIG. 6, two pairs of interlocked actuators are arranged in side-by-side relationship without inversion, whereas in FIG. 7 one pair of interlocked actuators is inverted relative to the other, as indicated by the transposition of the references 20a and 20b denoting the actuator sides nominally upper and lower in an orientation of the actuator for vertical axial displacement of its shaft.

The actuator 10 hereinbefore described thus makes it possible, by virtue of the configuration of the body 11 and disposition of the shaft 12, to construct a modular assembly of actuators which is of particular compact form and which has the individually driven shafts disposed at a predetermined pitch spacing in which, in effect, two shafts are accommodated in the width of a single actuator.

What is claimed is:

1. A modular assembly comprising a plurality of pairs of interlocking linear actuators, wherein each actuator of said pairs of interlocking linear actuators comprises:
   an actuator body;
   an axially displaceable shaft having a longitudinal axis and guided by the actuator body to be axially displaceable relative thereto in the direction of the longitudinal axis of the axially displaceable shaft; and
   a drive motor supported by the actuator body and operable to axially displace the shaft relative to the actuator body in two mutually opposite directions, the actuator body of each linear actuator having two mutually opposite sides respectively extending in two parallel spaced-apart planes which each represent a reference plane for positioning the actuator body in a side-by-side relationship with the actuator body of one of the actuators of another pair of interlocking actuators of the assembly, and
   a further side connecting the two mutually opposite sides and stepped to form a projection, through which the axially displaceable shaft passes with said longitudinal axis parallel to the two parallel spaced-apart planes so as to be guided in axial displacement and a rebate beside the projection, to permit the actuator body to be positioned at said further side in interlocking relationship with the actuator body of the other actuator of the respective pair,
   wherein the projection has a projection width that is the same as the rebate width with respect to the spacing of the two parallel spaced-apart planes and the axially displaceable shaft is disposed centrally of the projection to configure the pitch of the longitudinal axes of the axially displaceable shafts of each pair of interlocked actuators to be equal to said width.

2. The modular assembly according to claim 1, wherein the actuator body of each actuator comprises a casing supporting and enclosing the drive motor.

3. The modular assembly according to claim 1, wherein the actuator body of each actuator comprises a frame and the drive motor is supported by structural elements of the frame.

4. The modular assembly according to claim 1, wherein at least one of the two opposite sides of the actuator body of each actuator is formed by a continuous surface area extending in one of the two parallel spaced-apart planes.

5. The modular assembly according to claim 1, wherein at least one of the two opposite sides of the actuator body of each actuator is formed by a plurality of discrete surface areas lying in the respective one of the two parallel spaced-apart planes.

6. The modular assembly according to claim 1, wherein each actuator comprises a mechanically positive drive transmission arranged to transmit drive from the drive motor to the axially displaceable shaft.

7. The modular assembly according to claim 6, wherein the mechanically positive drive transmission comprises a rack extending along the axially displaceable shaft and a pinion meshing with the rack and rotatable by the drive motor.

8. The modular assembly according to claim 1, wherein each actuator comprises a mechanically non-positive drive transmission arranged to transmit drive from the drive motor to the axially displaceable shaft.

9. The modular assembly according to claim 8, wherein the mechanically non-positive drive transmission comprises a friction surface extending along the axially displaceable shaft and a friction wheel frictionally engaging the friction surface and rotatable by the drive motor.

10. The modular assembly according to claim 6, comprising a worm wheel and worm interposed between the drive motor and the transmission, the worm wheel being coupled to the transmission at a drive input thereof and the worm being drivingly engaged with the worm wheel and coupled to the drive motor at a drive output thereof.

11. The modular assembly according to claim 10, wherein the worm wheel is rotatable in opposite directions of rotation by the drive motor and non-rotatable in either of those directions by the worm wheel.

12. The modular assembly according to claim 1, wherein the axially displaceable shaft of each actuator is a solid rod.

13. The modular assembly according to claim 1, wherein the axially displaceable shaft of each actuator is a tube.

14. The modular assembly according to claim 13, wherein the tube is connectible with fluid conveying means and defines a conduit for a fluid medium from the fluid conveying means.

15. The modular assembly according to claim 13, wherein the tube is connectible with a device and defines a conduit for at least one conductor to or from the device.

16. The modular assembly according to claim 1, wherein each actuator comprises an optical sensing means for sensing two spaced-apart end positions of the axially displaceable shaft relative to the actuator body.

17. The modular assembly according to claim 16, the optical sensing means being operable to emit light for incidence on the axially displaceable shaft and to respond to reflection of light from the axially displaceable shaft at each of the two end positions.

18. The modular assembly according to claim 1, wherein the actuator body of each actuator is usable in either one of two mutually inverted orientations with the axially displaceable shaft extending vertically and comprises means for determining in which of the two orientations the actuator is disposed.

19. The modular assembly according to claim 1, comprising electrical connection means provided at each of an intended top and at an intended bottom of the actuator body of each actuator to in use allow electrical connection to the actuator selectably from either or each of above and below the actuator.

20. The modular assembly according to claim 1, wherein the actuator body of each actuator has at least one passage for reception of guide means to guide displacement of the actuator perpendicularly to the two parallel spaced-apart planes.

21. The modular assembly according to claim 1, wherein the longitudinal axes of the axially displaceable shafts of the actuators of the assembly are disposed in a line.

22. A machine comprising a modular assembly according to claim 1, and further comprising a control means for controlling the drive motors of the actuators of the assembly to displace the axially displaceable shafts of the actuators.

23. The machine according to claim 22, the control means being operable to cause the drive motors to displace the axially displaceable shafts of the actuators individually in a predetermined sequence.

24. The machine according to claim 22, the control means being operable to cause the drive motors to displace the axially displaceable shafts of the actuators in groups, wherein the axially displaceable shafts in each group are displaced simultaneously.

25. The machine according to claim 22, the control means being operable to cause the drive motors to displace all the axially displaceable shafts of the actuators simultaneously.

26. The machine according to claim 22, comprising displacing means for displacing the assembly perpendicularly to the two parallel spaced-apart planes of each actuator.

27. The machine according to claim 22, the machine being a pipetting machine in which the pitch of the longitudinal axes of the axially displaceable shafts of the actuators of the assembly corresponds with a given pitch of a plurality of receptacles for liquid samples.

28. The machine according to claim 27, wherein the given pitch is the pitch of the wells of a well plate of a standard format.

29. The machine according to claim 27, wherein the assembly is oriented so that each of the axially displaceable shafts of the actuators thereof is raisable and lowerable by the axial displacement of the axially displaceable shaft by the drive motor of the actuator and is equipped for co-operation in a lowered position with a respective receptacle for a liquid sample.

30. The machine according to claim 29, wherein each of the axially displaceable shafts is equipped with means for at least one of discharging liquid into and inducting liquid from the respective receptacle.

* * * * *